May 13, 1924.
J. G. JOHNSON
1,493,817
AUTOMATIC PRESSURE REGULATING VALVE
Filed Oct. 24, 1922
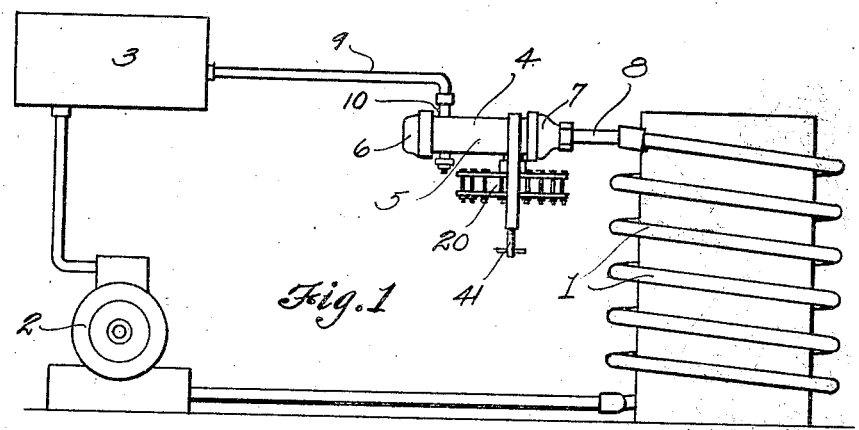
Fig. 1
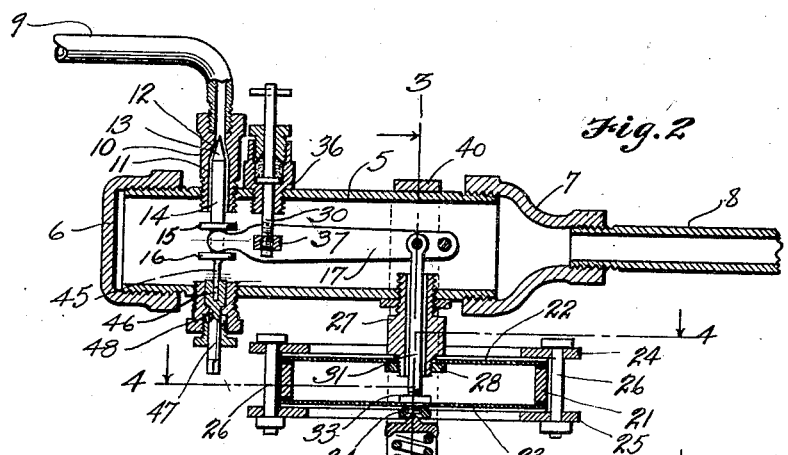
Fig. 2
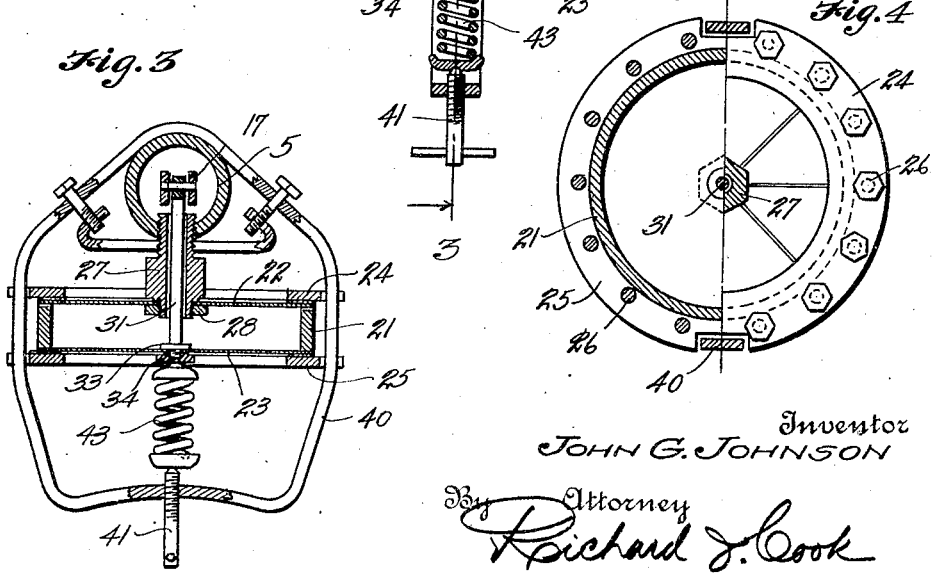
Fig. 3
Fig. 4
Inventor
JOHN G. JOHNSON
By Attorney
Richard J. Cook Patented May 13, 1924.

1,493,817

UNITED STATES PATENT OFFICE.

JOHN G. JOHNSON, OF TACOMA, WASHINGTON, ASSIGNOR OF ONE-HALF TO R. CLAYTON McRAE AND JOHN A. McRAE, BOTH OF TACOMA, WASHINGTON.

AUTOMATIC PRESSURE-REGULATING VALVE.

Application filed October 24, 1922. Serial No. 596,591.

*To all whom it may concern:*

Be it known that I, JOHN G. JOHNSON, a citizen of the United States, and a resident of the city of Tacoma, county of Pierce, State of Washington, have invented certain new and useful Improvements in Automatic Pressure-Regulating Valves, of which the following is a specification.

My invention relates to automatic valves, and more particularly to improvements in automatic pressure regulating valves of that type especially adapted to be used in ammonia refrigerating systems for the purpose of controlling the feeding of liquid ammonia from the storage tank into the expansion coils.

It is the principal object of the invention to provide an automatically operating valve mechanism of the above character whereby enough of the liquid ammonia will be fed into the expansion coils to maintain a certain desired pressure within the latter.

More specifically, it is the object of the invention to provide a control valve, a member embodying a diaphragm that expands and contracts under the change of pressure within the same and means of operatively connecting the diaphragm with the valve whereby the valve is opened or closed accordingly as is required to maintain a constant pressure.

Other objects of the invention reside in the provision of means for adjusting the tension of the controlling diaphragm and for effecting manual adjustment of the valve moving lever.

Another important object of the invention is to provide means whereby the control valve stem may be ground without being removed from the device, so that leakage due to uneven wear can be avoided.

In accomplishing these and other objects of the invention, I have provided the improved details of construction, the preferred forms of which are illustrated in the accompanying drawings, wherein—

Figure 1 is an illustration of a refrigerating system equipped with an automatic pressure regulating valve according to the present invention.

Figure 2 is an enlarged longitudinal sectional view of the valve and control mechanism.

Figure 3 is a transverse section taken on the line 3—3 in Figure 2.

Figure 4 is a horizontal section on the line 4—4 in Figure 2.

Referring more in detail to the several views of the drawings, wherein like reference characters designate the same or like parts—

1 designates what may be the expansion coils of a refrigerating system, 2 a compressor whereby ammonia gas may be drawn from the coils and forced under pressure into a cooling tank 3 wherein the gas passes into a liquid state and from which it is automatically fed by means of the valve mechanism embodied by the present invention and designated at 4, again into the expansion coils 1. Since the system is old in the art and embodies no part of this invention, no further explanation of it will be made.

The device 4 consists of a tubular body 5 that is closed at one end by means of a cap 6 and at its other end is fitted with a reducer 7 from which a pipe 8 leads to the expansion coils 1. Liquid ammonia from the tank 3 is delivered to the valve tube through a small pipe 9 which is threaded into the outer end of a valve housing 10 which, in turn, is threaded into the tube 5 near its closed end. The channel 11 of the valve housing is provided with a conically tapered valve seat 12 and fitted against this is the tapered inner end 13 of a valve stem 14 which, by its movement, controls the flow of liquid ammonia into the tube 5. This valve stem is equipped within the tube 5 with two spaced apart collars 15 and 16 between which one end of an adjusting lever 17 is fitted and which is controlled, as is presently described, to seat or unseat the valve stem.

Located beneath the tube 5 is a pressure regulating drum 20 consisting of a ring like body 21 closed at its opposite sides by means of diaphragms 22 and 23 which are clamped against the ring in a gas tight joint by means of overlying clamping rings 24 and 25 through which clamping bolts 26 are extended. This drum is supported from the tube 5 by means of connecting tube 27 which is threaded into the tube 5 and centrally through the diaphragm 22 and has a clamping nut 28 threaded onto its end against the inner face of the diaphragm.

Referring again to the lever 17, it is pivotally supported, near the end connected with the valve stem 14, from the inner end of a rod 30 that is fixed in the tube 5, and at its other end is connected by means of a rod 31 with the lower diaphragm 23 of the expansion drum 20; the rod being extended through the tube 27 and fixed to the diaphragm by means of nuts 33 and 34 threaded thereon against opposite side of the diaphragm.

In this construction, the rod 30 is mounted within a packing box 36 that is threaded into tube 5 and at its inner end is threaded through a block 37 that is pivotally mounted between the arms forming the lever 17. By turning the rod 30 the lever 17 can be raised or lowered for the purpose of adjusting the end of the valve stem 14 from or against the valve seat 12.

In order that I may control the expansion of the diaphragms, I have extended a band 40 about the tube 5 and beneath the drum and have threaded a screw 41 through the lower portion of this band, and between the inner end of the screw and the nut 34 I have placed a coiled compression spring 43 which resists expansion of the drum diaphragm to a greater or lesser degree according to the pressure that is exerted against its outer end by the adjustment of screw 41.

It has been observed in devices of this character that the end of the valve stem 14 often becomes worn and leakage results unless the valve can be ground from time to time, and in order that this may be done I have provided the lower end of the stem 14 with a flattened portion 45 that is slidably fitted within a socket 46 at the inner end of a shaft 47 which extends into the tube 5 through a packing gland 48. The shaft 47 has a squared head 49 at its outer end for receiving tool whereby it may be revolved to effect a grinding action of the point of the stem against the tapered seat.

With the device so constructed, it is apparent that the liquid ammonia will, upon unseating of the valve stem 14, be delivered into the tube 5 and will there expand to create a certain pressure within the pipe coils and drum 20. When this pressure reaches a certain predetermined degree, the diaphragms 22 and 23 will have separated to such an extent that the lever 17 will be moved so as to cause stem 14 to be lifted and the end 13 seated against seat 12 to shut off any further flow of ammonia into the coils. When this pressure has been reduced, the diaphragms move toward each other and this causes the valve to be opened and more ammonia admitted. In this way the operation continues and thereby maintains a constant pressure of gas within the coils.

Manual adjustment for a quicker opening or closing of the valve may be effected by adjustment of the screw 41 or the lever supporting rod 30.

Having thus described my invention, what I claim is new and desire to secure by Letters Patent, is:

1. A pressure regulator of the class described comprising a housing having inlet and outlet pipes connected thereto; said inlet pipe having a valve seat therein, a valve stem mounted within the housing having an end adapted to the seat, a lever pivotally supported within the housing and operatively connected at one end with the valve stem, a drum connected with the housing and adapted to expand and contract in accordance with the varying of pressure within the housing and means connecting the drum and lever to actuate the valve stem between open and closed positions.

2. A pressure regulator of the class described comprising a housing having inlet and outlet pipes connected thereto; said inlet pipe having an inwardly tapered valve seat, a valve stem mounted within the housing having an end adapted to said seat, a lever adjustably supported with the housing, having one end operatively connected with the valve stem, a drum connected with the housing and equipped with diaphragms adapted to expand and contract in accordance with the varying of pressure within the housing, a link connecting a diaphragm of the drum and lever for actuating the valve stem and an adjustable tensioning means engaging the diaphragm.

3. A pressure regulator of the class described, comprising a housing having inlet and outlet connections therewith, a valve operable to control the inlet opening, a drum connected with the housing and equipped with a diaphragm that is adapted to expand and contract in accordance with the varying of pressure within the housing, means connecting the diaphragm and valve whereby the latter is moved between open and closed position, a yoke supported from the housing, a spring supported in engagement with the diaphragm and an adjustable screw operable to vary the pressure of the spring against the diaphragm.

4. In a pressure regulating device of the class described, a housing having an outlet and an inlet provided with a valve seat, a valve stem mounted within the housing having a tapered end fitted to the valve seat and having a squared opposite end, means operable in accordance with the change of pressure within the housing for actuating the valve stem between closed and open positions, and a stem rotatably mounted in a packed gland in the housing wall, having a squared socket at its inner end slidably receiving the squared end of the valve stem and having a head at its outer end for receiving a tool whereby it may be revolved to effect revolving of the valve stem and a grinding action of the latter against the valve seat.

Signed at Seattle, Washington, this 19th day of October, 1922.

JOHN G. JOHNSON.